(12) United States Patent
Young et al.

(10) Patent No.: US 7,904,110 B2
(45) Date of Patent: Mar. 8, 2011

(54) SYSTEM AND METHOD FOR RECEIVING DIGITAL SATELLITE RADIO AND GPS

(75) Inventors: James P. Young, Cedar Rapids, IA (US); Steven A. Gronemeyer, Cedar Rapids, IA (US)

(73) Assignee: SiRF Technology Inc., San Jose, CA (US)

( * ) Notice: Subject to any disclaimer, the term of this patent is extended or adjusted under 35 U.S.C. 154(b) by 586 days.

(21) Appl. No.: 10/151,471

(22) Filed: May 17, 2002

(65) Prior Publication Data
US 2004/0072575 A1 Apr. 15, 2004

Related U.S. Application Data

(60) Provisional application No. 60/291,707, filed on May 17, 2001, provisional application No. 60/291,717, filed on May 17, 2001.

(51) Int. Cl.
*H04M 1/00* (2006.01)

(52) U.S. Cl. ............... 455/552.1; 455/456.1; 455/427

(58) Field of Classification Search ............... 455/344, 455/84, 179.1, 180.1, 180.3, 182.1, 183.1, 455/183.2, 552.1–553.1, 255–265
See application file for complete search history.

(56) References Cited

U.S. PATENT DOCUMENTS

| | | | | |
|---|---|---|---|---|
| 3,906,503 A | * | 9/1975 | Stephens | 342/458 |
| 4,426,734 A | * | 1/1984 | Tults et al. | 455/552.1 |
| 6,029,052 A | * | 2/2000 | Isberg et al. | 455/131 |
| 6,161,002 A | * | 12/2000 | Migliaccio et al. | 455/150.1 |
| 6,195,563 B1 | * | 2/2001 | Samuels | 455/84 |
| 6,208,844 B1 | * | 3/2001 | Abdelgany | 455/82 |
| 6,298,243 B1 | * | 10/2001 | Basile | 455/552.1 |
| 6,694,129 B2 | * | 2/2004 | Peterzell et al. | 455/76 |
| 6,694,150 B1 | * | 2/2004 | Standke et al. | 455/552.1 |
| 6,714,158 B1 | * | 3/2004 | Underbrink et al. | 342/357.12 |
| 6,831,957 B2 | * | 12/2004 | Chen | 375/345 |
| 6,832,071 B1 | * | 12/2004 | Nakamura et al. | 455/430 |
| 6,856,794 B1 | * | 2/2005 | Tso et al. | 455/260 |
| 7,283,784 B2 | * | 10/2007 | Smith et al. | 455/3.02 |
| 2001/0049241 A1 | * | 12/2001 | McClure et al. | 441/88 |
| 2002/0022465 A1 | * | 2/2002 | McCullagh et al. | 455/260 |
| 2004/0208137 A1 | * | 10/2004 | Martinez | 370/282 |
| 2009/0098880 A1 | * | 4/2009 | Lindquist | 455/456.1 |

* cited by examiner

Primary Examiner — Lana N Le
(74) Attorney, Agent, or Firm — RatnerPrestia

(57) ABSTRACT

A combined Global Position System ("GPS") and radio system for receiving GPS signals and radio signals is disclosed. The combined GPS and radio system includes a controller that controls a switchable frequency source and a mixer in signal communication with the switchable frequency source. The mixer is capable of receiving both GPS signals and radio signals and producing corresponding intermediate frequency ("IF") signals in response to receiving a frequency reference signal from the switchable frequency source that has a first switch state of operation that corresponds to the mixer receiving GPS signals and a second switch state of operation the corresponds to the mixer receiving radio signals.

86 Claims, 8 Drawing Sheets

SYSTEM AND METHOD FOR RECEIVING DIGITAL SATELLITE RADIO AND GPS

CROSS-REFERENCE TO RELATED APPLICATIONS

This application claims the benefit of Provisional Patent Application Ser. No. 60/291,717, filed on May 17, 2001, and entitled "MEANS FOR RECEIVING DIGITAL SATELLITE RADIO AND GPS USING A SINGLE RECEIVER," and Provisional Patent Application Ser. No. 60/291,707, filed on May 17, 2001, and entitled "MEANS FOR RECEIVING AM, SW, FM, DIGITAL SATELLITE RADIO AND GPS USING A SINGLE RECEIVER," which applications are incorporated herein reference.

BACKGROUND OF THE INVENTION

1. Field of the Invention

This invention relates generally to the field of wireless communications. In particular, the invention relates to wireless communication systems capable of receiving both digital satellite radio and Global Positioning Systems ("GPS") signals.

2. Related Art

The worldwide utilization of wireless devices such as two-way radios, portable televisions, Personal Digital Assistants ("PDAs") cellular telephones (also known a "mobile phones"), satellite radio receivers and Global Positioning Systems ("GPS"), also known as NAVSTAR, is growing at a rapid pace. As the number of people employing wireless devices increases, the number of features offered by wireless service providers also increases, as does the integration of these wireless devices in other products. As an example, the present trend in the automobile and truck industry is to produce automobiles and trucks that have amplitude modulation ("AM"), frequency modulation ("FM"), phase modulated ("PM"), short-wave ("SW") and single-side band ("SSB") radios, mobile phones, GPS receivers, digital radios (also known as digital audio broadcasting "DAB" systems) and satellite radios (also known as digital satellite radios, or "DSRs," that receive programming from service providers such as, for example, Sirius Satellite Radio, XM Satellite Radio, Orbit Satellite Television and Radio Network, and WorldSpace Corp.) The recreational ship, boat and airplane industries are also following the same trend as the automobile and truck industry. Additionally, integration in wireless devices is occurring with the mobile phone industry integrating GPS capabilities within the mobile phones to meet the Enhanced 911 (also known as "E911") services mandated by the United States Congress.

As these wireless devices are integrated into products such as automobiles, ships, boats, airplanes, motorcycles, other transportation products and mobile phones, the cost and complexity of producing these products also increases along with the space requirements with a vehicle. Therefore, a goal of these industries includes producing these products with integrated wireless devices that have the highest performance at the lowest implementation cost.

As in many other areas of electronics, in order to minimize the implementation cost, retain a desired performance, and reduce component size, designers usually attempt to maximize the level of integration, minimize the complexity and minimize any adjustments that may be required (such as tuning). Unfortunately, the radio frequency "RF," intermediate frequency "IF," and baseband portions of a wireless device are usually the most difficult to implement with high levels of integration, reduced complexity and minimal, or no, tuning.

Additionally, all known implementations of wireless devices such as radio receivers (whether AM, FM, PM, SW, SSB, DAB and/or DSR) and GPS receivers utilize a separate path for each RF radio band received. For example, in current wireless systems the ability to receive GPS signals is accomplished with GPS receiver circuitry, and the ability to receive DSR signals is accomplished with DSR circuitry separate from the GPS receiver circuitry. As a result, these current wireless systems have system architectures that typically include multiple mixers, components that utilize IF frequencies in the down conversion process of the signal, double down conversion circuitry, and external components that include RF and IF filters, coils and transformers. Examples of these type of implementations include the following GPS and radio chipsets: Conexant 6732, third generation Gemini/Pisces solutions, owned by SiRF Technology, Inc., San Jose, Calif., GPS architectures utilizing Colossus RF ASIC by Trimble, PVT-6 receiver and RF chip MRFIC 1504, by Motorola, Inc., Schaumburg, Ill., BT1575A GPS receiver by BethelTronix Inc, Cerritos, Calif., PCS and GPS receiver RFR3300 and IRF 3300 by Qualcomm, Inc., San Diego, Calif., UPB1005GS by NEC, Corp, Japan, and CXA1951AQ by Sony, Inc., Japan.

Therefore, there is a need for a system and method that allows GPS and radio (such as AM, FM, SW, SSB, DAB and/or DSR) signals to be received utilizing the same receiver circuitry. Additionally, there is also a need to enhance the performance of the system, reduce the system cost, reduce and/or eliminate any tuning required and reduce the utilization of external components.

SUMMARY

A combined Global Position System ("GPS") and radio system is disclosed. As an example implementation, the combined GPS and radio system ("CGRS") may utilize a system architecture that receives either GPS signals or the radio signals and also receives a frequency reference signal from a switchable frequency source having a first state of operation corresponding to GPS signals and a second state of operation corresponding to radio signals, where the switchable frequency source is controlled by a controller. The CGRS then may produce intermediate frequency ("IF") signals in response to receiving the GPS signals, radio signals and frequency reference signal.

An example implementation of the CGRS architecture may include a controller that controls a switchable frequency source and a mixer in signal communication with the switchable frequency source. The mixer is capable of receiving both GPS signals and radio signals and producing corresponding intermediate frequency ("IF") signals in response to receiving a frequency reference signal from the switchable frequency source that has a first switch state of operation that corresponds to the mixer receiving GPS signals and a second switch state of operation the corresponds to the mixer receiving radio signals. The radio signals may be amplitude modulation ("AM"), frequency modulation ("FM"), phase modulated ("PM"), short-wave ("SW"), single-side band ("SSB"), and/or digital signal such as digital satellite radio ("DSR") or digital audio broadcasting ("DAB") signals.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
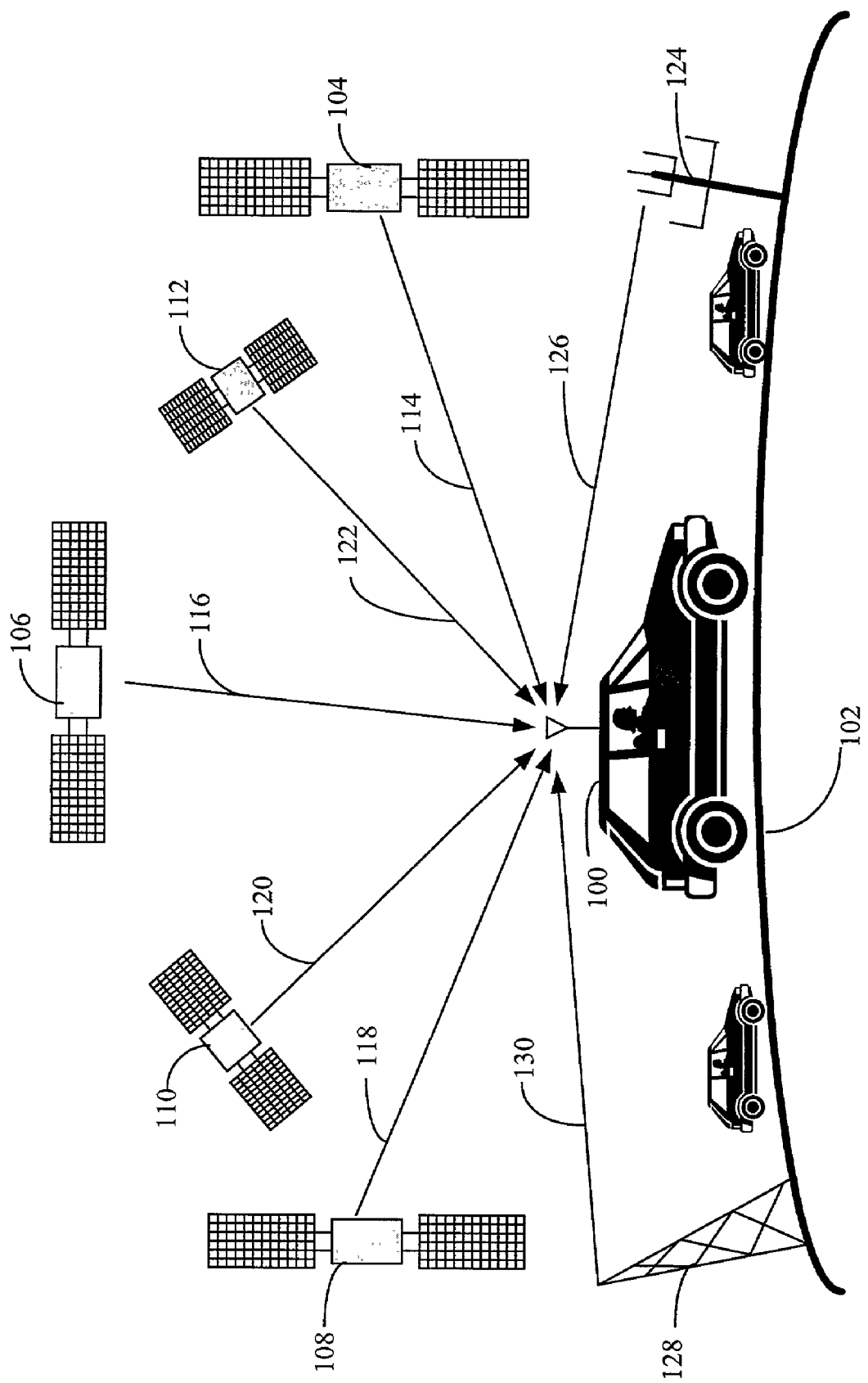
FIG. 1 illustrates a diagram of an example implementation of a wireless device, such as a combined Global Positioning System ("GPS") and radio system ("CGRS"), within an automobile receiving positional information and radio signals from a plurality of satellites and ground sources.

A typical Global Positioning System ("GPS") system has approximately 12 satellites that may be visible at any one time to a wireless device. Global Positioning System or "GPS" means any system utilizing satellites and/or land-based communications devices for providing or enabling the determination of a location of the wireless device on the earth, for example but not limited to: NAVSTAR, GLONASS, LORAN, Shoran, Decca, or TACAN.

GPS is an example of a satellite based navigation system that may be utilized by GPS portion of the combined GPS and radio system ("CGRS") to pinpoint its location on earth. The array of GPS satellites transmits highly accurate, time coded information that permits CGRS to calculate its exact location in terms of latitude and longitude on earth as well as the altitude above sea level. The GPS system is designed to provide a base navigation system with accuracy to within 100 meters for non-military use and greater precision for the military.

The space segment of the GPS system is a constellation of satellites orbiting above the earth that contain transmitters, which send highly accurate timing information to GPS receivers on earth. The fully implemented GPS system consists of 21 main operational satellites plus three active spare satellites. These satellites are arranged in six orbits, each orbit containing three or four satellites. The orbital planes form a 55° angle with the equator. The satellites orbit at a height of 10,898 nautical miles (20,200 kilometers) above earth with orbital periods for each satellite of approximately 12 hours.

Each of the orbiting satellites contains four highly accurate atomic clocks. These provide precision timing pulses utilized to generate a unique binary code (also known as a pseudo random or pseudo noise "PN" code) that is transmitted to earth. The PN code identifies the specific satellite in the constellation. The satellite also transmits a set of digitally coded ephemeris data that completely defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the exact position of the satellite above the earth at any given time. A ground control station updates the ephemeris data of the satellite once per day to ensure accuracy.

A typical GPS receiver configuration is designed to pick up signals from three, four, or more satellites simultaneously. The GPS receiver decodes the information and, using the time and ephemeris data, calculates the approximate position of the GPS receiver. The GPS receiver contains a processor that performs the necessary calculations and may output a decimal display of latitude and longitude as well as altitude on the handset. Readings from three satellites are necessary for latitude and longitude information. A fourth satellite reading is required in order to compute altitude.

Digital radio signals may include digital audio broadcasts ("DAB") and digital satellite radio ("DSR") signals. The DAB broadcasting system (Digital Audio Broadcasting, described in "Digital Audio Broadcasting" ITU-COM 89, Geneva, October 1989, and in "Kunftige Systeme der digitalen Horfunkubertragung", Bayerischer Rundfunk, November 1990, both incorporated herein by reference) was developed to permit the servicing of individual regions with a plurality of broadcasting programs. In general, the DAB system provides a multiplicity of individual synchronized transmitters each of which respectively transmits six digital stereo sound signals in bit-synchronism in a Coded Orthogonal Frequency Division and Multiplexing ("COFDM") signal packet. Under the COFDM principle the digital data stream of the stereo signal is divided, prior to transmission, into a multiplicity of sub-signals each of which is separately transmitted by a single carrier. In a DAB radio receiver these sub-signals are then recombined to recover the overall information of the digital stereo signal. Additionally, DAB signals are typically compressed prior to the COFDM processing (generally known as "source coding"). Typically this compression reduces the data quantity of the DAB signals in accordance with known methods such as MPEG 1, layer II (also know as Masking Universal Subband Integrated Coding and Multiplexing "Musicam," described in "An Universal Subband Coding System Description", CCETT IRT Matsushita and Philips) or MPEG 2, layer III, that both utilizes the psychoacoustic phenomena of the human ear to reduce the amount of data in the transmitted signals without losing appreciable sound quality.

As a result, DAB techniques are being proposed to improve the quality of broadcasting over conventional amplitude modulation ("AM") and frequency modulation ("FM") analog signals. In-Band-On-Channel ("IBOC") DAB is a proposed digital broadcasting scheme in the United States, in which analog AM or FM signals are simulcast along with the DAB signal. The digital audio signal is generally compressed such that a minimum data rate is required to convey the audio information with sufficiently high fidelity.

DSR is an improvement on early satellite communication systems that utilized space-based radio frequency transponders that generally acted as simple repeaters. In a typical early satellite communication scheme, multiple sources each transmit at a separate uplink carrier center frequency utilizing frequency-division multiple access "FDMA" techniques in the uplink, and the satellite transponder simply repeated each signal at a separate downlink carrier frequency in the downlink. In another typical early satellite communication scheme utilizing time-division multiple access ("TDMA"), multiple sources each transmit bursts at the same carrier frequency in a coordinated fashion so that bursts from different transmitters do not collide, and the transponder repeated all signals in a single downlink carrier. Still other early satellite communication schemes utilized multiple antenna beams and on-board-the-satellite switching so that signals in one uplink beam could be controllably switched to a selected downlink beam. Typically, these early satellite communication systems required substantial transmit and/or receive equipment and despite the various types of system architectures, there was no implemented system suitable for direct broadcast of audio radio programming to low-cost consumer radio receivers.

DSR may still utilize FDMA uplinks and TDMA downlinks, however, broadcast stations transmit one or more "prime rate" channels, each having a source signal data rate of sixteen ("16") kilobit-per-second ("kbps") data rates. Each prime rate channel is transmitted on a separate carrier and at the satellite, prime rate uplink channels are multiplexed into a single TDMA channel. Radio receivers then de-multiplex the TDMA downlink and recombine one or more prime rate channels to provide the selected quality of service. A system control center provides centralized command over the satellite.

An example system may utilize the L frequency band of 1467 to 1492 MHz, which has been allocated for Broadcasting Satellite Service ("BSS") DAB at WARC 92, that is, in accordance with resolutions 33 and 528 of the ITU. In this example, the broadcasters utilize feeder uplinks in X band from 7050 to 7075 MHz.

This example system typically utilizes digital audio coding techniques similar to DAB and each satellite delivers digital radio audio signals having fidelity qualities equivalent to AM monaural, FM monaural, FM stereo and compact disk ("CD") stereo throughout its respective coverage area, together with ancillary data such as paging, video images and text transmissions directly to the digital satellite radios. The system may also deliver multimedia services such as large database downloads to PCs for business applications, map and printed text information for travelers, and even color images to augment audio programs for advertising and entertainment.

A radio receiver may receive the L band signal, demodulate and extract, from the TDMA stream, the useful audio signal and expand the sound into its original form. Typically, the downlink transmission to the radio receiver utilizes TDMA, multiple channel per carrier techniques where prime rate (usually 16.056 kps) channels occupies its own time slot in the time division stream. These prime rate channels are combined to carry program channels ranging from 16 to 128 kps. Use of digital techniques allows for ancillary services to the radio receiver including slow motion image, paging, mailing, fax, use of flat screens or serial interface. This data and information may be multiplexed within the audio digital signal channels.

Each radio receiver may tune to one of the 1.767688 million symbol per second TDMA carriers transmitted in one of the beam coverages. A low noise amplifier ("LNA") in the radio receiver may boost the satellite signal, and the boosted signal may be received by circuitry in the radio receiver that includes a receiver, demodulator, time division demultiplexer (which recovers the prime rate channels) and forward error correction ("FEC") decoder. The output of this circuitry is a baseband digital signal.

Typically, the instructions needed for the radio receiver to control the recombination of the coded prime channels into the coded program channels are usually contained in a control word imbedded in each coded prime rate channel. The recombined coded program channels thus recovered are decoded and de-interleaved to recover the original baseband prime rate bit stream that entered the satellite system at the broadcaster's earth terminal. The recovered bit streams may then be converted back to the original analog audio signal by a source decoder in the radio receiver and the radio receiver may reproduce various audio qualities ranging from AM monaural to CD stereo depending on the program channel bit rate.

In FIG. 1, a combined GPS and radio system ("CGRS") 100, integrated in an automobile, on the surface of the earth 102 receives positional and radio information from a plurality of satellites, pseudolites (such as base stations) and radio stations. For example, in FIG. 1, five satellites 104, 106, 108, 110 and 112 are shown transmitting to the CGRS 100 via signal paths 114, 116, 118, 120 and 122, respectively. FIG. 1 also shows pseudolite (i.e., "base station") 124 transmitting to the CGRS 100, via signal path 126, and radio transmitter 128 transmitting to CGRS 100 via signal path 130. As an example, satellites 104, 106 and 108 may transmit positional information, via GPS signals, to CGRS 100 and satellites 110 and 112 and radio transmitter 128 may transmit radio signals to CGRS 100.

The radio transmitter 128 may transmit a number of different radio signals that include AM, FM, phase modulated ("PM"), short-wave ("SW"), single-side band ("SSB"), and/or digital encoded signals such as DAB signals. Radio transmitter 128 is shown as an individual transmitter, but in practice a plurality of radio transmitters may be present. Satellites 110 and 112 may also transmit digital encoded signals such as DSR signals. And, similarly, there may be a plurality of satellites transmitting radio signals.

Figure 2:
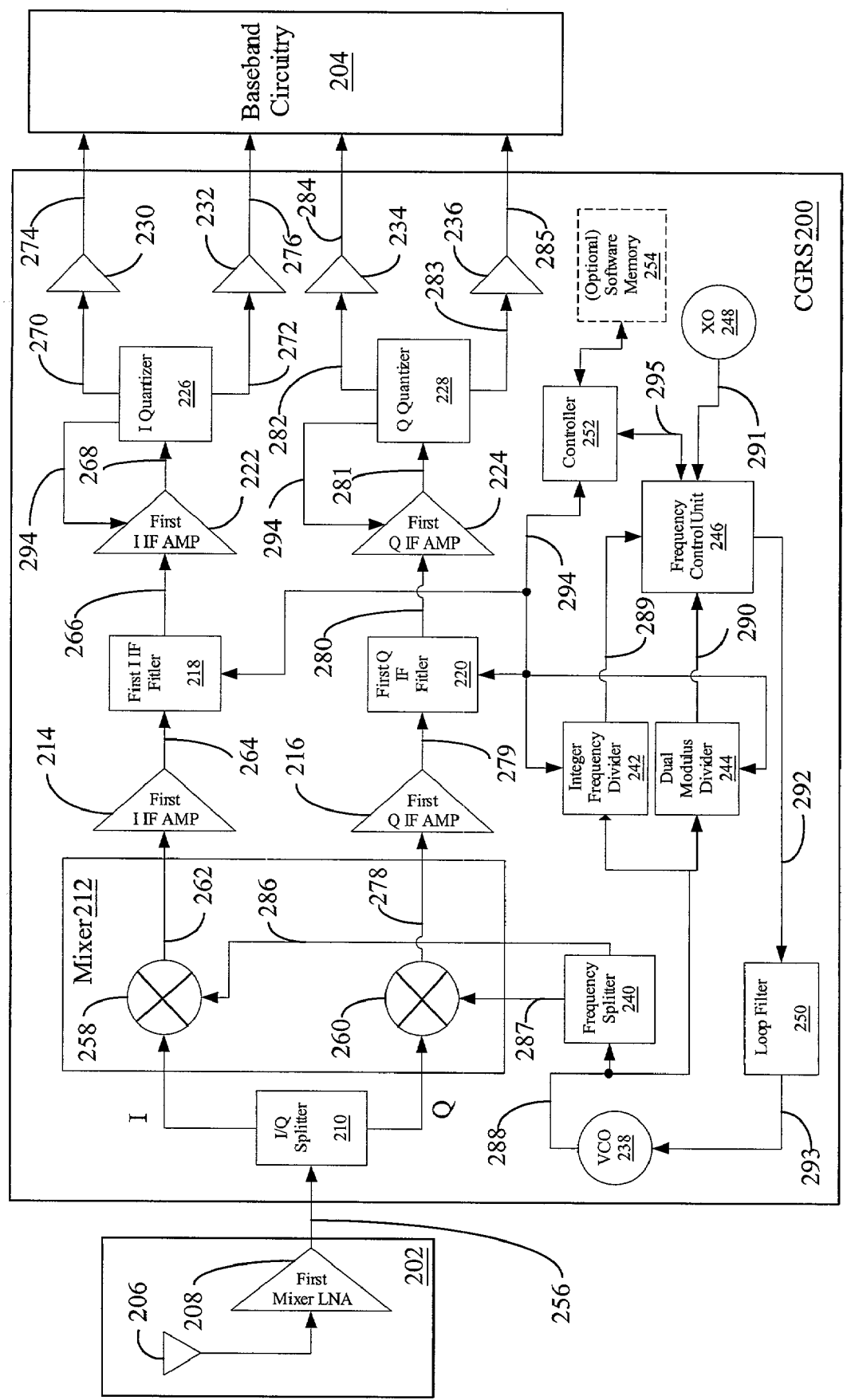
FIG. 2 is a block diagram illustrating an example implementation of the CGRS shown in FIG. 1.

In FIG. 2, a block diagram of an example implementation of CGRS 200 is shown. CGRS 200 is in signal communication with a radio frequency ("RF") front-end unit 202 and baseband circuitry 204. The RF front-end unit 202 may include an antenna 206 that receives the GPS or radio signals from free-space and a first mixer low noise amplifier ("LNA") 208.

The first mixer LNA 208 is in signal communication with a quadrature splitter 210 in CGRS 200. CGRS 200 may include the quadrature splitter 210, complex mixer 212, first in-phase ("I") intermediate frequency ("IF") amplifier 214, first quadrature phase ("Q") IF amplifier 216, first I IF filter 218, first Q IF filter 220, first I IF amplifier 222, first Q IF amplifier 224, I quantizer 226, Q quantizer 228, I buffers 230 and 232, Q buffers 234 and 236, switchable frequency source (such as a voltage controlled oscillator "VCO") 238, frequency splitter 240, integer frequency divider 242, dual modulus divider 244, frequency control unit 246, secondary frequency reference source (such as an oscillator "XO" or and external frequency source) 248, loop filter 250, controller 252, and optional software memory 254.

Complex mixer 212 is preferable a wide bandwidth direct conversion mixer. As an example implementation, complex mixer 212 may be designed to receive signals in the range of 0.005 megahertz ("Mhz") to 2 gigahertz ("Ghz") and capable of decoding any modulation scheme with bandwidths of approximately 5 Mhz, including AM, FM, CW, ISB and SSB modulations. Other example direct conversion mixer implementation of complex mixer 212 may be implemented in the system described in U.S. Pat. No. 5,230,099, entitled "System for controlling phase and gain errors in an I/Q direct conversion receiver," issued to Roger Loper on Jul. 20, 1993, which is incorporated by reference. Additionally, complex mixer 212 may also be implemented in systems described by U.S. Pat. No. 6,148,184, entitled "Radio frequency zero if direct down converter," issued to Tajinder Manku on Nov. 14, 2000, U.S. Pat. No. 6,157,260, entitled "Method and apparatus for calibrating a local oscillator in a direct conversion receiver," issued to Keith Tilley, Rajesh Zele, Walter Kehler, on Dec. 5, 2000, U.S. Pat. No. 6,175,728, entitled "Direct conversion receiver capable of canceling DC offset voltages," issued to Masataka Mitama, on Jan. 16, 2001, U.S. Pat. No. 6,192,225, entitled "Direct conversion receiver," issued to Domenico Arpaia, on Feb. 20, 2001, U.S. Pat. No. 6,208,850, entitled "Direct conversion receiver per-selection," Nigel Tolson, on Dec. 2, 1998, U.S. Pat. No. 6,243,569, entitled "Direct-conversion receiver for digital-modulation signal," issued to Masahiro Mimura et al., issued on May 22, 2001, and U.S. Pat. No. 6,243,569, entitled "Direct conversion circuit for radio frequency signals," issued to Simon Atkinson, on Jun. 5, 2001, which are all incorporated by reference.

In an example operation, the RF front-end unit 202 receives a GPS or radio signal from free-space, amplifies it with first mixer LNA 208 and passes the amplified version of the signal to quadrature splitter 210 via signal path 256. The signal is received by quadrature splitter 210 and split into I and Q components and applied to complex mixer 212. The complex mixer 212 demodulates the signal by removing the RF carrier and leaving an IF signal. Complex mixer 212 may further include a sub-mixer 258 for the I channel and sub-mixer for the Q channel 260.

The I component of the IF signal is then applied to first IF amplifier 214, via signal path 262. First Q IF amplifier 214 amplifies the IF signal and applies the amplified IF signal to first I IF filter 218, via signal path 264. First I IF filter 218 filters the IF signal and passes the IF signal to first I IF amplifier 222, via signal path 266. I IF amplifier 222 amplifies the filtered IF signal again and applies it to I quantizer 226, via signal path 268. If the received signal is a GPS signal, I quantizer 226 processes the received IF signal and quantizes it into either a three-level or four-level quantized signal based on whether the I quantizer 226 is a 1.5 bit or 2 bit quantizer. The output of the quantizer 226 is then applied to quantizer buffers 230 and 232, via signal paths 270 and 272, respectively. The quantizer buffers 230 and 232 then pass the quantized values of the quantized signal to the rest of the baseband circuitry of the receiver such as the baseband circuitry 204 via signal paths 274 and 276, respectively. The quantized values of the quantizer buffers 230 and 232 are either a binary number that represent that the signal value is greater than a reference value ("S>R") or that the signal value is less than the negative magnitude of the reference value ("S<−R") in a three-level quantizer, or a binary number that represent the magnitude and sign of the signal value in a four-level quantizer.

If instead of a GPS signal, a radio signal is received, quantizer 226 will typically employ approximately 8-bit quantization instead of the 1.5 bit to 2 bit quantization employed in GPS applications.

Similar to the I component, the Q component of the IF signal is applied to first Q IF amplifier 216 via signal path 278. First Q IF amplifier 216 amplifies the IF signal and applies the IF signal to first Q IF filter 220, via signal path 279. First Q IF filter 220 filters the IF signal and passes the IF signal to first Q IF amplifier 224, via signal path 280. The Q IF amplifier 224 amplifies the IF signal again and applies it to quantizer 228, via signal path 281. The Q quantizer 228 processes the IF signal and quantizes it into either a three-level or four-level quantized signal based on whether the Q quantizer 228 is a 1.5 bit or 2 bit quantizer for a GPS application. The output of the quantizer 228 is then applied to quantizer buffers 234 and 236, via signal paths 282 and 283, respectively. The quantizer buffers 234 and 236 then pass the quantized values of the quantized signal to the rest of the baseband circuitry of the receiver such as the timing and sampling unit 204 via signal paths 284 and 285, respectively. The quantized values of the quantizer buffers 234 and 236 are either a binary number that represent that the signal value is greater than a reference value ("S>R") or that the signal value is less than the negative magnitude of the reference value ("S<−R") in a three-bit quantizer, or a binary number that represent the magnitude and sign of the signal value in a four-bit quantizer.

Again, if instead of a GPS signal, a radio signal is received, Q quantizer 228 will typically employ approximately 8-bit quantization instead of the 1.5 bit to 2 bit quantization employed in GPS applications.

Quantizers 226 and 228 may produce automatic gain control ("AGC") signals 294 and 296, respectively, that control the amount of amplification applied by first IF amplifiers 222 and 224. The AGC signals are utilized to prepare the information going to the quantizers from the first IF amplifiers. In the case of radio signals, the AGC signals are applied to the first IF amplifiers to raise the signal-to-noise ratio of the signal before being received by the quantizers. However, in the case of GPS signals that are spread spectrum CDMA type signals, the AGC signals are applied to first IF amplifiers to raise the noise floor because the GPS signals, when received in their spread spectrum form, appear to have power levels close to the noise floor.

The complex mixer 212 demodulates the received signal from the complex splitter 210 and the I frequency reference signal 286 and Q frequency reference signal 287 produced by the frequency splitter 240. The frequency splitter 240 may produce I frequency reference signal 286 and Q frequency reference signal 287 from a frequency reference signal 288, which is produced by the switchable frequency source 238. An example implementation of the frequency splitter 240 may be a 90 degree phase shifter that produces a 90 degree phase shift between I frequency reference signal 286 and Q frequency reference signal 287 from the frequency reference signal 288.

The switchable frequency source 238 is controlled by a phase-lock loop ("PLL") that may include integer frequency divider 242, dual modulus divider 244, frequency control unit 246, and loop filter 250. Integer frequency divider 242 and dual modulus divider 244 produce fixed divide and fractional frequency reference signals 289 and 290, respectively, from frequency reference signal 288. Fixed divide frequency reference signal 289 is produced if there is an integer relationship between the oscillator signal 291, generated by oscillator (also known as second frequency reference source or XO) 248, and frequency reference signal 288. Fractional frequency references 290 is produced if there is not an integer relationship between the oscillator signal 291 and the frequency reference signal 288.

Fixed divide and factional frequency references 289 and 290 and oscillator signal 291 are input into the frequency control unit 246. In response, the frequency control unit 246 produces a frequency control signal 292 that is first filtered by loop filter 250. The filtered frequency control signal 293 (typically a voltage signal) is then applied to switchable frequency source (typically a VCO) 238. The filtered frequency control signal 293 controls the VCO 238 and keeps the frequency reference signal 288 accurate.

Controller 252 controls the operation of the first I IF filter 218, first Q IF filter 220, integer divider 242, dual modulus divider 244 and frequency control unit 246, via signal paths 294 and 295. Controller 252 may be any type of control device that may be selectively implemented in software, hardware (such as a computer, processor, micro controller or the equivalent), or a combination of hardware and software. Controller 252 may utilize optional software in a software memory 254. Controller 252 modifies the operation of first IF filters 218 and 220 and frequency source 246 in response to receiving either a GPS or radio signal.

Software in software memory 254, which includes an ordered listing of executable instructions for implementing logical functions, may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

If CGRS 200 receives a GPS signal, the controller 252 is capable of switching the band of operation of switchable frequency source 238 to demodulate signals in the GPS frequency band. If, instead, CGRS 200 receives a radio signal, the controller 252 is capable of switching the band of operation of switchable frequency source 238 to demodulate signals in the radio frequency band instead of the GPS band. Additionally, the controller 252 is capable of switching the band of operation of switchable frequency source 238 to demodulate signals in numerous radio bands such as AM, FM, PM, SW, SSB, DAB and DSR bands. The controller 252 is also able to switch the band of operation of first IF filters 218 and 220 via the signal path 294. Ideally, first IF filters 218 and 220 are wide bandwidth type of filters, however, as the frequency bands of received radio signals significantly departs from the frequency band of operation for GPS, the IF filters 218 and 220 will typically need to by modified by the controller 252 in order to maintain their acceptable performance.

It is appreciated by those skilled in the art that CGRS 200 does not have to continuously track GPS, DAB and DSR signals because the GPS signal may be sampled with a small duty cycle and gain sufficient to resolve the position of the CGRS 200. Additionally, several automotive solutions provide aiding to a GPS receiver by providing wheel tics or gyro inputs that help the GPS receiver navigate during time that it is not receiving a GPS signal. Also, DSR and DAB radio signals are usually transmitted on six channels of information on one frequency using TDMA coding. Therefore, DSR or DAB receiver only needs to be tuned to the digital radio signal one sixth of the time. As a result, CGRS 200 is capable of switching between GPS and satellite radio signals and still provide a user with performance that seems to be the result of continuous tracking of both the GPS and DAB/DSR radio signal. As an example, if CGRS 200 was implemented utilizing Scorpio 1 and Magna or in Scorpio 2 semiconductor chips (all three chip are owed by SiRF Technology, Inc., San Jose, Calif.), the GPS portion of CGRS 200 may sample the GPS signal utilizing a gated tracking loop (not shown) at 200 milliseconds every second and still provide a GPS solution. Additionally, if CGRS 200 is implemented utilizing a Magna mode of operation, the GPS portion of the CGRS 200 may sample the GPS signal at 20 milliseconds, two or three times per second and still provide an acceptable GPS solution.

Additionally, controller 252 is capable of disabling the I channel receiver path (i.e., the signal path that includes signal path 262, first I IF amplifier 214, signal path 264, first I IF filter 218, signal path 266, first I IF amplifier 222, signal path 268, I quantizer 226 and signal paths 270, 272, 274 and 274 and buffers 230 and 232) and sampling the Q channel receiver path (i.e., the signal path that includes signal path 278, first Q IF amplifier 216, signal path 279, first Q IF filter 220, signal path 280, first Q IF amplifier 224, signal path 281, Q quantizer 228 and signal paths 282, 283, 284 and 285 and buffers 234 and 236) at a sampling rate equal to four times the IF frequency. Alternatively, controller 252 is capable of disabling the Q channel receiver path and sampling the I channel receiver path at a sampling rate equal to four times the IF frequency. As a result, for instance in the latter case, the I channel receiver path is capable of producing all the quadrature components because at four times the IF frequency each sample is 90 degrees (i.e., orthogonal) apart from every other sample.

Figure 3:
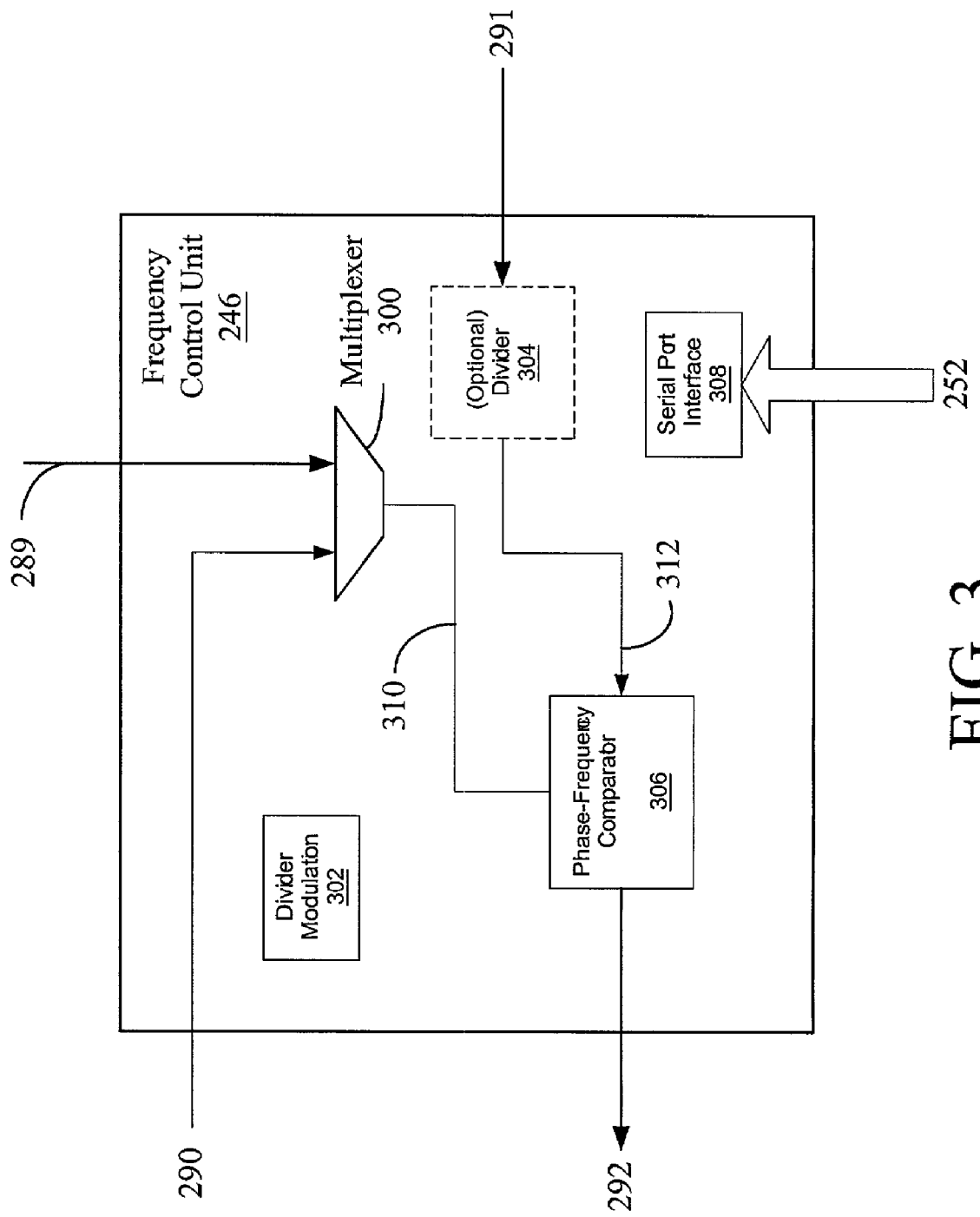
FIG. 3 is a block diagram illustrating an example implementation of the frequency control unit shown in FIG. 2.

In FIG. 3, a block diagram of an example implementation of the frequency control unit 246 is shown. The frequency control unit 246 may include a multiplexer 300, divider modulation unit 302, optional divider 304, phase-frequency comparator 306 and serial port interface 308. The multiplexer 300 receives the factional frequency signal 290 and fixed divide signal 289 and chooses one of them to pass to the phase-frequency comparator 306 via signal path 310. Optional divider 304 may receive the signal 291 from the second frequency reference source (also known as XO) 248 and divides the signal 291 down and pass it to the phase frequency comparator 306. Alternatively, if there is no optional divider 304, signal 291 is directly sent to phase-frequency comparator 306. In phase-frequency comparator 306, the phase of the selected signal 310 from the multiplexer 300 is compared to the signal 291. The result of the comparison is sent to loop filter 250 via signal path 292, which filters the resultant signal and passes it to the switchable frequency source 238. In this way, the frequency drift of the switchable frequency source 238 and may be accurately controlled by the PLL. The controller 252 typically controls the frequency control unit 246 via signal path 252 that is connected to serial port interface 308.

Figure 4:
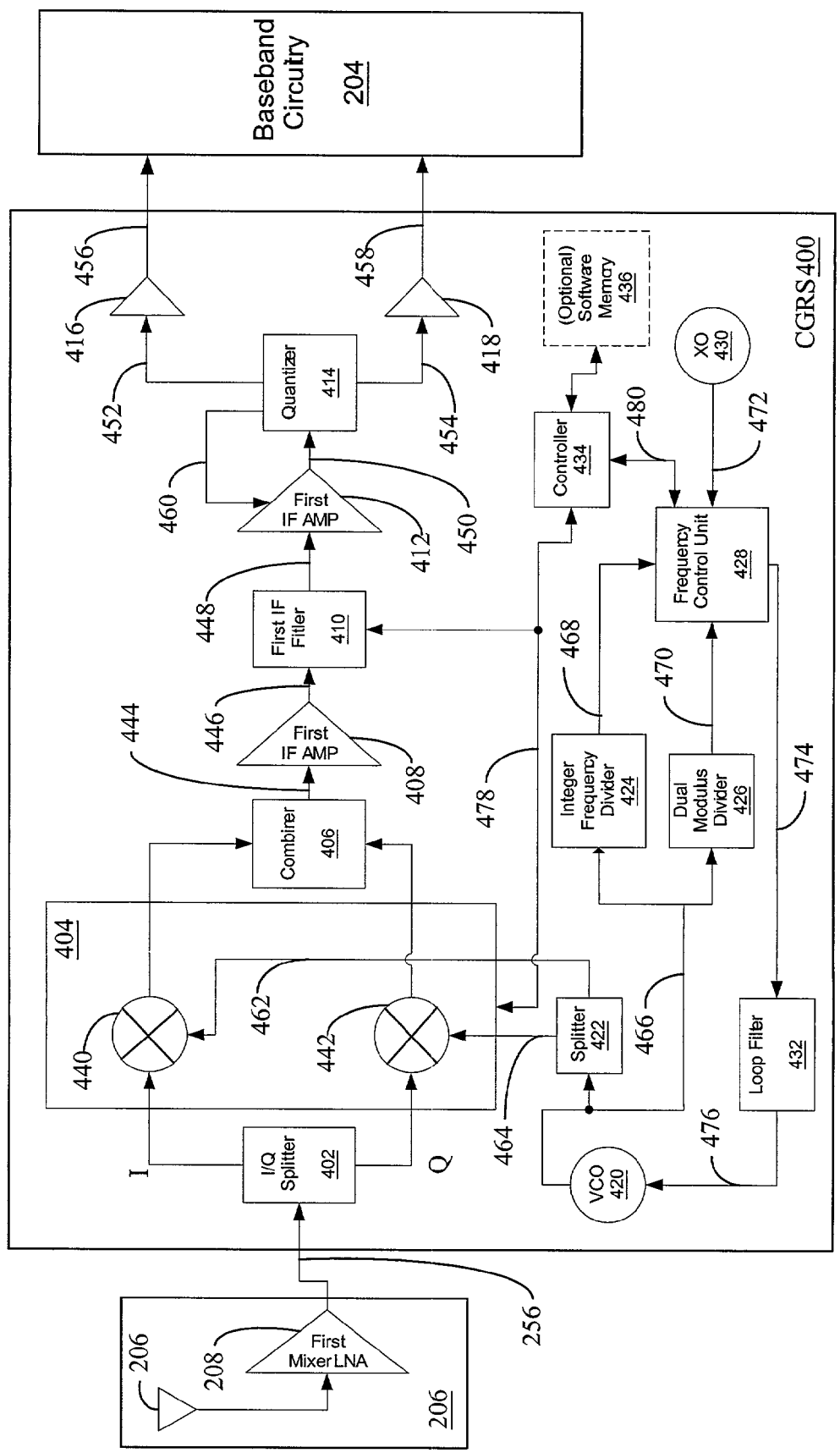
FIG. 4 is a block diagram illustrating another example implementation of the CGRS shown in FIG. 1.

In FIG. 4, a block diagram of another example implementation of CGRS 400 is shown. CGRS 400 is in signal communication with the RF front-end unit 202 and timing and sample unit 204.

The first mixer LNA 208 is in signal communication with a quadrature (also known as I/Q) splitter 402 in CGRS 400. CGRS 400 may include the quadrature splitter 402, complex mixer 404, combiner 406, first IF amplifier 408, first IF filter 410, first IF amplifier 412, quantizer 414, buffers 416 and 418, switchable frequency source (such as a voltage controlled oscillator "VCO") 420, frequency splitter 422, integer frequency divider 424, dual modulus divider 426, frequency control unit 428, secondary frequency source (such as an XO or external frequency source) 430, loop filter 432, controller 434 and optional software stored in software memory 436.

In an example operation, the RF front-end unit 202 receives a GPS or radio signal from free space amplifies it with first mixer LNA 208 and passes the amplified version of the signal to I/Q splitter 402 via signal path 256. The signal is then split into I and Q components and applied to complex mixer 404. The complex mixer 404 demodulates the signal by removing the RF carrier and leaving an IF signal. Complex mixer 404 may further include a sub-mixer for the I channel 440 and Q channel 442.

The I and Q components of the IF signal are applied to combiner 406. The combined IF signal is then applied to first IF amplifier 408 via signal path 444. First IF amplifier 408 then amplifies the IF signal and applies the IF signal to first IF filter 410 via signal path 446. First IF filter 410 filters the combined IF signal and passes the combined IF signal to first IF amplifier 412 via signal path 448. The IF filter 412 then amplifies the combined IF signal again and applies it to quantizer 414 via signal path 450. The quantizer 414 then process the combined IF signal and quantizes it into either a three level or four level quantized signal based on whether the whether the quantizer 414 is a 1.5 bit or 2 bit quantizer for GPS signals (or approximately and 8 bit quantizer for radio signals). The output of the quantizer 414 is then applied to quantizer buffers 416 and 418, via signal paths 452 and 454, respectively. The quantizer buffers 416 and 418 then pass the quantized values of the quantized signal to the rest of the baseband circuitry of the receiver such as baseband circuitry 204 via signal paths 456 and 458, respectively. The quantized values of the quantizer buffers 416 and 418 are either a binary number that represent that the signal value is greater than a reference value ("S>R") or that the signal value is less than the negative magnitude of the reference value ("S<−R") in a three-bit quantizer, or a binary number that represent the magnitude and sign of the signal value in a four-bit quantizer.

Quantizer 414 may produce an AGC signal 460 that controls the amount of amplification applied by first IF amplifier 412. As described previously, in FIG. 2, the AGC signal typically amplifies a signal such as 448 in order to increase the signal-to-noise ration for radio signals but the AGC typically amplifies the noise floor in for GPS signals.

The complex mixer 404 demodulates the received signal from the complex splitter 402 with I frequency reference signal 462 and Q frequency reference signal 464 produced by the frequency splitter 422. Similar, to FIG. 2, the frequency splitter 422 may produce I frequency reference signal 462 and Q frequency reference signal 464 from a frequency reference signal 466, which is produced by switchable frequency source (VCO) 420. Again an example implementation of the frequency splitter 420 may be a 90 degree phase shifter that produces a 90 degree phase shift between I frequency reference signal 462 and Q frequency reference signal 464 from the frequency reference signal 466.

The switchable frequency source (VCO) 420 is controlled by a PLL that includes integer frequency divider 424, dual mode divider 426, frequency control unit 428 and loop filter 432. Integer divider 424 and dual modulus divider 426 produce a fixed divide and fractional frequency reference signals 468 and 470, respectively, that are produced from frequency reference signal 466. Fixed divide and fractional frequency reference signals 468 and 470 and oscillator signal 472, from XO 430, are input into the frequency control units 428. The frequency control unit 428 then produces a frequency source signal 474 that is filtered by loop filter 432. The filtered signal 476 (typically a voltage signal) is applied to switchable frequency source (VCO) 420. The filtered signal 476 controls the VCO 420 and keeps the frequency reference signal 466 accurate. The frequency control unit 428 may be a part or component of a frequency synthesizer. The frequency synthesizer may include switchable frequency source 420, frequency splitter 422, integer frequency divider 424, dual modulus divider 426, frequency control unit 428, secondary reference frequency source (XO), controller 434, loop filter, 432 and optional software memory 436. The frequency synthesizer may be a fractional N frequency synthesizer, pseudorandom noise type frequency synthesizer, or other type of similar frequency generating device. It is appreciated by those skilled in the art that in known spread spectrum systems, the pseudo random noise type frequency synthesizer is a device including a frequency synthesizer in signal communication with a pseudo random code generator, where the frequency synthesizer is driven by a pseudo random sequence of numbers produced by the pseudo random code generator to generate output frequencies that "hop around" in the desired frequency range.

Controller 434 controls the operation of integer frequency divider 424, dual modulus divider 426, first IF filter 410, and frequency control unit 428, via signal paths 478 and 480. Similar, to FIG. 2, controller 434 may be any type of control device that may be selectively implemented in software, hardware (such as a computer, processor, micro controller or the equivalent), or a combination of hardware and software. Controller 434 may utilize optional software residing in software memory 436. Controller 434 modifies the operation of complex mixer 404, first IF filters 410 and frequency control unit 428 in response to receiving either a GPS or radio signal.

If CGRS 400 receives a GPS signal, the controller 434 is capable of switching the band of operation of switchable frequency source 420 to demodulate signals received by the CGRS 400 in the GPS frequency band. If, instead, CGRS 400 receives a radio signal, the controller 434 is capable of switching the band of operation of switchable frequency source 420 to demodulate signals in the radio frequency band instead of the GPS band. Additionally, the controller 434 is capable of switching the band of operation of switchable frequency source 420 to demodulate signals in numerous radio bands such as AM, FM, PM, SW, SSB, DAB and DSR bands. The controller 434 is also able to switch the value of the frequency control unit signal 474 via the frequency control unit 428. Therefore, the controller 434 is capable of switching the RF input frequency band received by CGRS 400 by changing the switchable frequency source 420 to the complex mixer 404. As a result, the complex mixer 404 is chosen to be as broadband as possible to increase the number of bands that may be processed by CGRS 400.

Similar to FIG. 2, it is appreciated by those skilled in the art that CGRS 400 does not have to continuously track GPS, DAB and DSR signals because the GPS signal may be sampled with a small duty cycle and gain sufficient to resolve the position of the CGRS 400. Additionally, several automotive solutions provide aiding to a GPS receiver by providing wheel tics or gyro inputs that help the GPS receiver navigate during time that it is not receiving a GPS signal. Also, DSR and DAB radio signals are usually transmitted on six channels of information on one frequency using TDMA coding. Therefore, DSR or DAB receiver only needs to be tuned to the digital radio signal one sixth of the time. As a result, CGRS 400 is capable of switching between GPS and satellite radio signals and still provide a user with performance that seems to be the result of continuous tracking of both the GPS and DAB/DSR radio signal.

Figure 5:
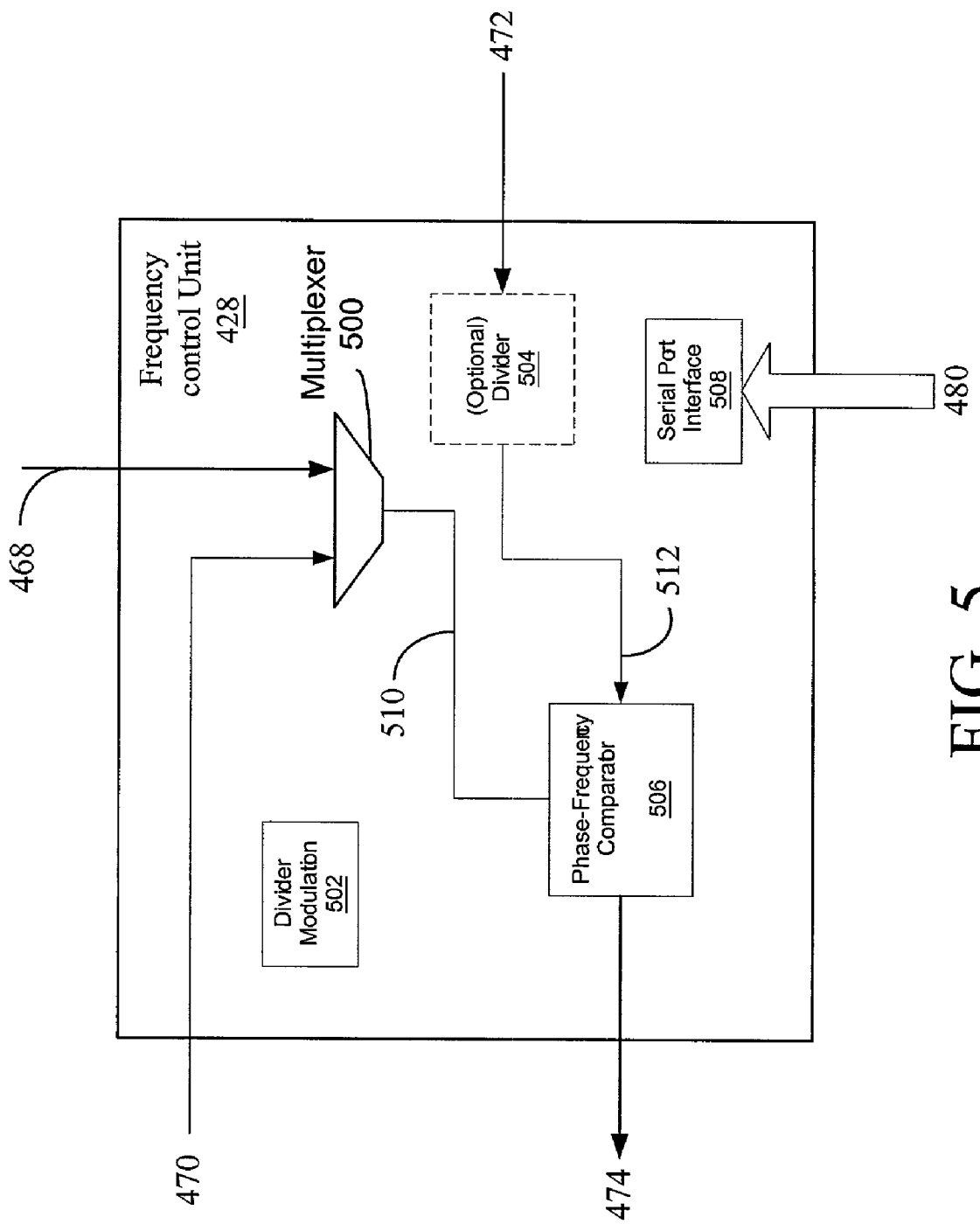
FIG. 5 is a block diagram illustrating an example implementation of the frequency control unit shown in FIG. 4.

In FIG. 5, a block diagram of an example implementation of the frequency control unit 428 is shown. The frequency control unit 428 may include a multiplexer 500, divider modulation unit 502, optional divider 504, phase-frequency comparator 506 and serial port interface 508. The multiplexer 500 receives the factional frequency signal 468 and fixed divide signal 470 and chooses one of them to pass to the phase-frequency comparator 506 via signal path 510. Optional divider 504 may receive the signal 472 from the second frequency reference source, XO, 430, divide the signal 472 down and pass it to the phase frequency comparator 506. Alternatively, if there is no optional divider 504, signal 472 is directly sent to phase-frequency comparator 506. In phase-frequency comparator 506, the phase of the selected signal 510 from the multiplexer 500 is compared to the signal 472. The result of the comparison is sent to loop filter 432 via signal path 474, which filters the resultant signal and passes it to the switchable frequency source 420. In this way, the frequency drift of the switchable frequency source 420 may be accurately controlled by the PLL. The controller 434 typically controls the frequency control unit 428 via signal path 480 that is connected to serial port interface 508.

Figure 6:
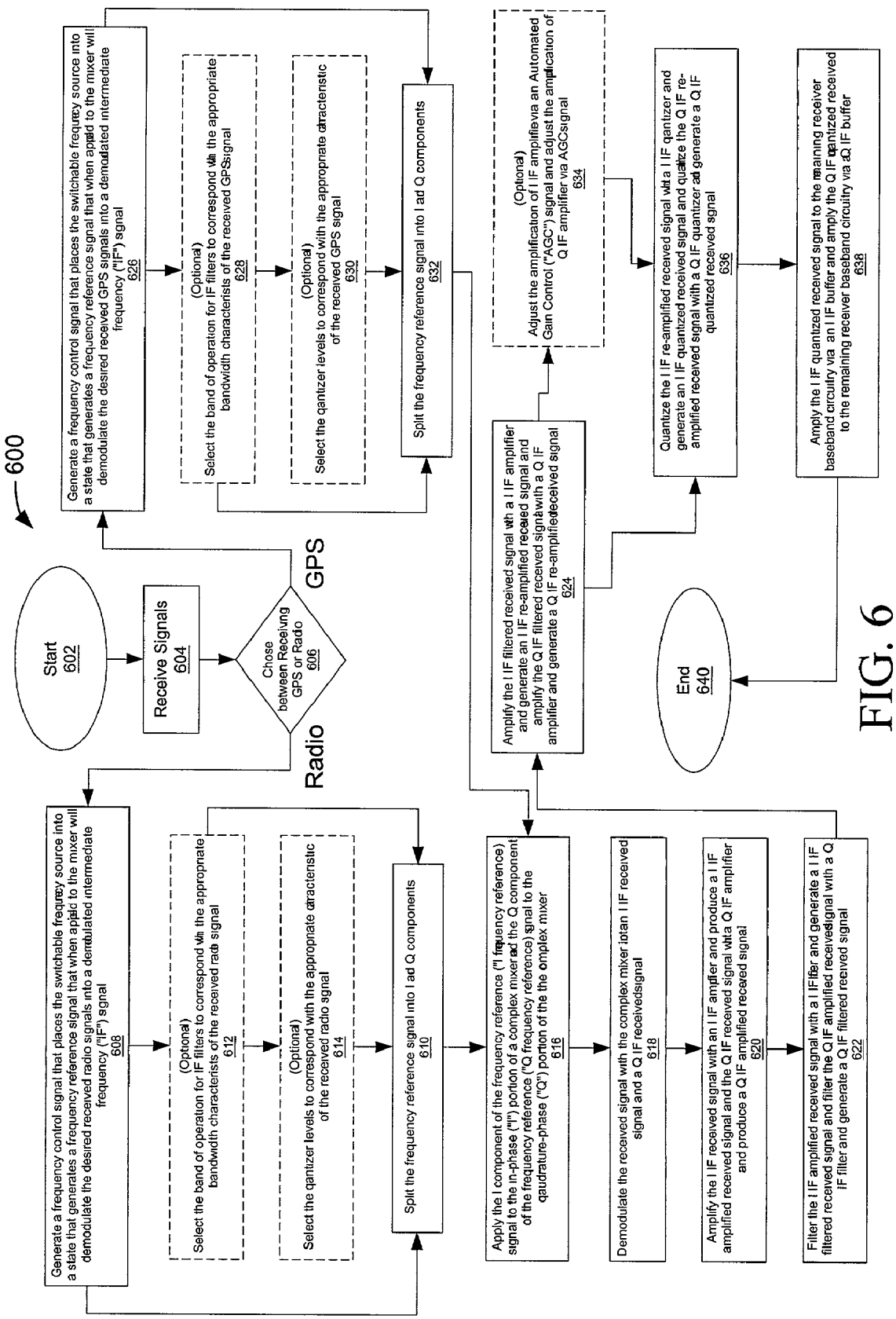
FIG. 6 is a flow chart illustrating an example process performed by the CGRS of FIG. 2.

In FIG. 6, a flow chart 600 is shown illustrating an example process performed by the example implementation of the system in FIG. 32

Figure 7:
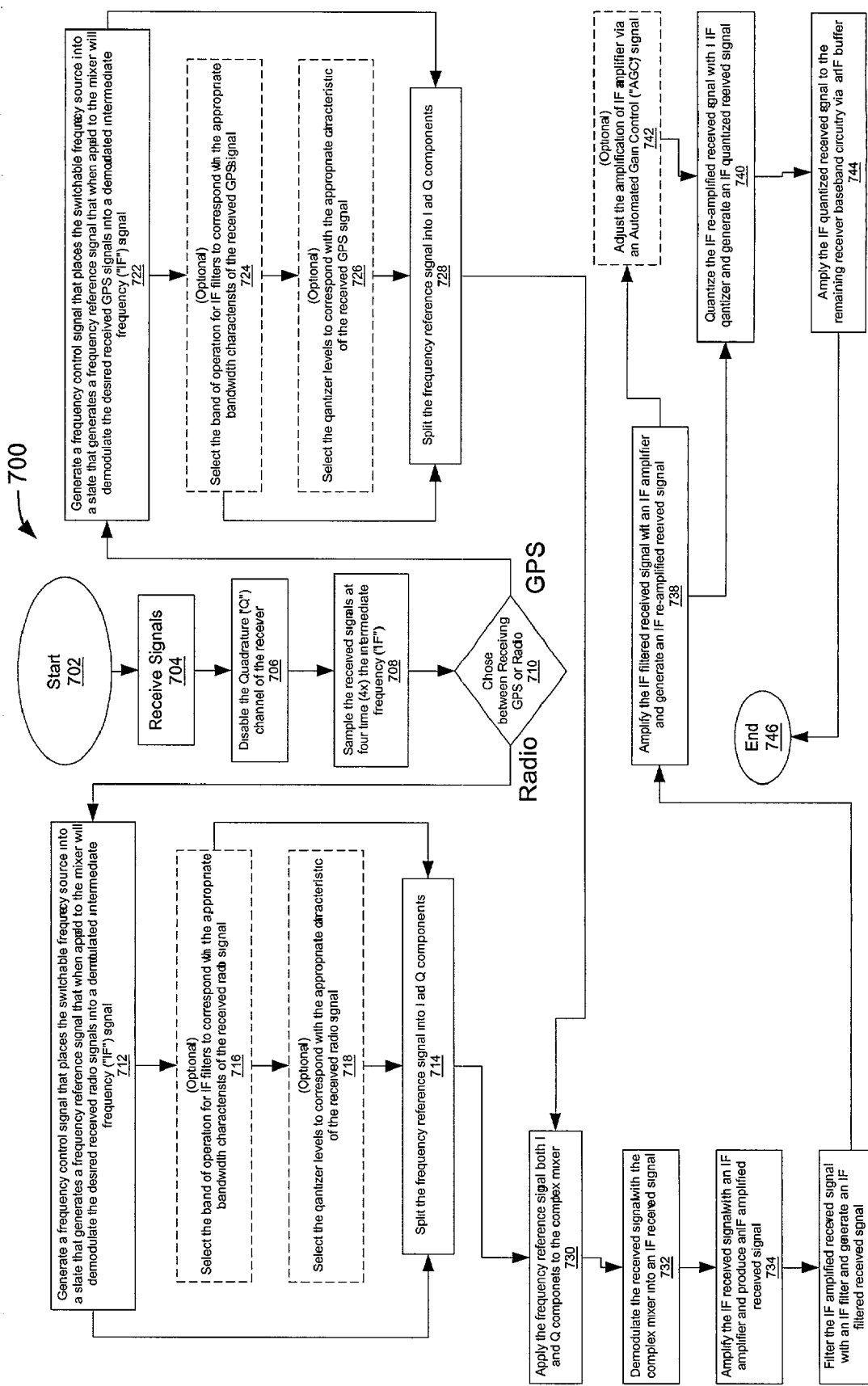
FIG. 7 is a flow chart illustrating another example process performed by the CGRS of FIG. 2.

In FIG. 7, a flow chart 700 is shown illustrating another example process performed by the example implementation of the system in FIG. 2.

Figure 8:
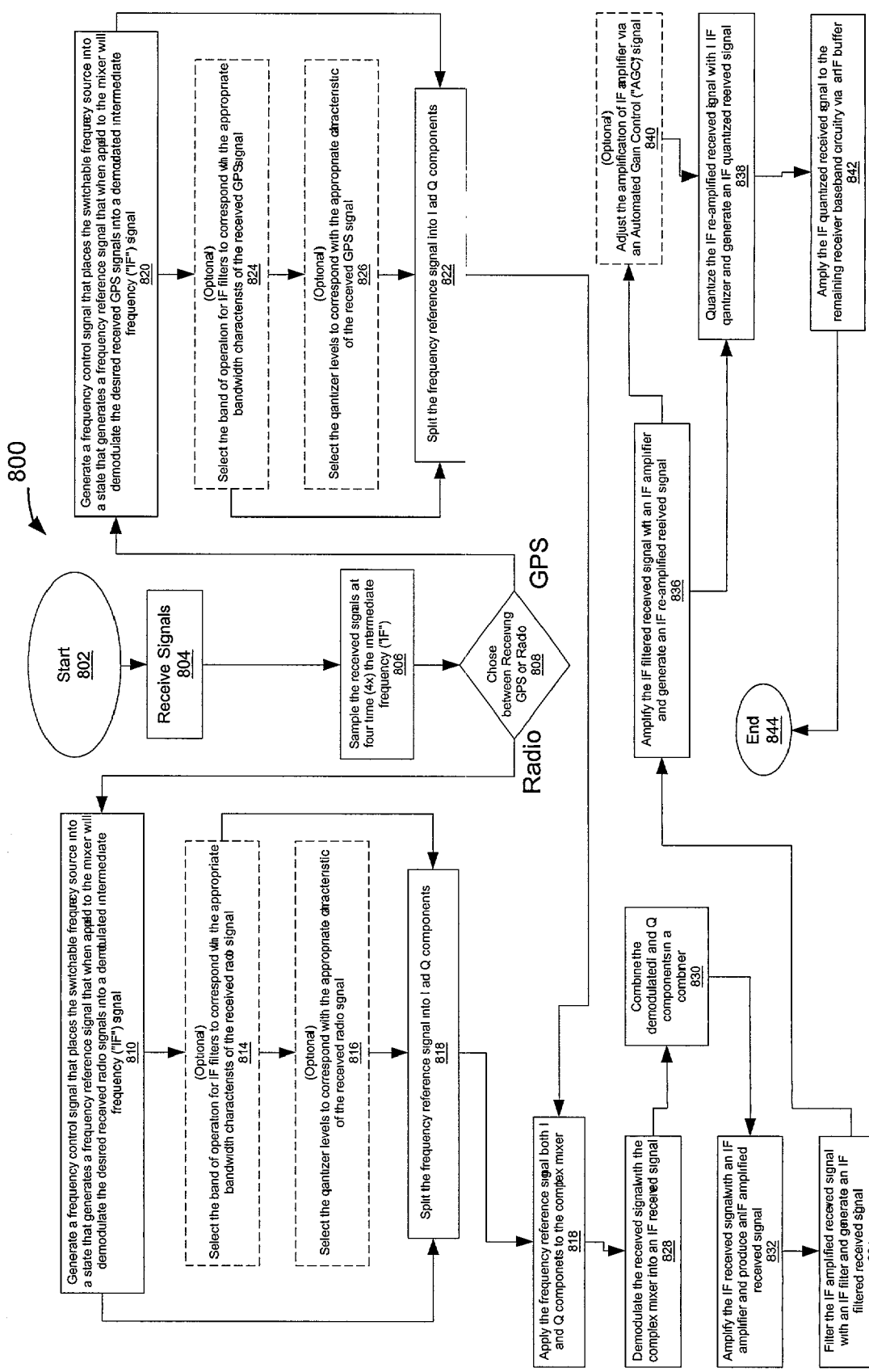
FIG. 8 is a flow chart illustrating an example process performed by the CGRS of FIG. 4.

In FIG. 8, a flow chart 800 is shown illustrating an example process performed by the example implementation of the system in FIG. 4.

While various embodiments of the invention have been described, it will be apparent to those of ordinary skill in the art that many more embodiments and implementations are possible that are within the scope of this invention.

What is claimed is:

1. A combined Global Positioning System ("GPS") and radio system for receiving GPS signals and radio signals, the combined GPS and radio system comprising:
 a switchable frequency source to generate a frequency reference signal having a first switch state of operation that corresponds to receiving GPS signals and a second switch state of operation that corresponds to receiving radio signals;
 a mixer in signal communication with the switchable frequency source, the mixer is capable of receiving both GPS signals and radio signals and producing corresponding intermediate frequency ("IF") signals in response to receiving the frequency reference signal; and
 a controller to control the switchable frequency source to periodically switch between the first switch state of operation and the second switch state of operation at a duty cycle determined to resolve a position of the combined GPS and radio system based on the received GPS signals.

2. The combined GPS and radio system of claim 1, wherein the switchable frequency source is a voltage controlled oscillator.

3. The combined GPS and radio system of claim 2, wherein the voltage controlled oscillator is part of a frequency synthesizer.

4. The combined GPS and radio system of claim 3, wherein the frequency synthesizer is a factional N frequency synthesizer.

5. The combined GPS and radio system of claim 3, wherein the frequency synthesizer is in signal communication with a pseudo-random code generator.

6. The combined GPS and radio system of claim 3, further including a second frequency reference source in signal communication with the frequency synthesizer.

7. The combined GPS and radio system of claim 6, wherein the second frequency reference source is an oscillator.

8. The combined GPS and radio system of claim 6, wherein the second frequency reference source is an external source.

9. The combined GPS and radio system of claim 1, wherein both GPS signals and radio signals have corresponding duty cycles.

10. The combined GPS and radio system of claim 9, wherein the controller limits the reception of GPS signals by the mixer to a low duty cycle.

11. The combined GPS and radio system of claim 9, wherein the controller limits the reception of radio signals by the mixer to a low duty cycle.

12. The combined GPS and radio system of claim 1, wherein the controller is programmable.

13. The combined GPS and radio system of claim 12, wherein the controller is capable of executing logic instructions that are encoded in software form.

14. The combined GPS and radio system of claim 1, wherein the controller is a micro-controller.

15. The combined GPS and radio system of claim 1, wherein the controller is a computer.

16. The combined GPS and radio system of claim 1, further including a radio frequency ("RF") front-end module in signal communication with the mixer, where the RF front-end module is capable of receiving either GPS signals or radio signals and passing the received GPS signals or radio signals to the mixer.

17. The combined GPS and radio system of claim 1, wherein the radio signals are of type selected from the group consisting of amplitude modulation ("AM"), frequency modulation ("FM"), phase modulated ("PM"), short-wave ("SW") and single-side band ("SSB").

18. The combined GPS and radio system of claim 1, wherein the radio signals are digital encoded signals.

19. The combined GPS and radio system of claim 18, wherein the digital encoded signals are digital satellite radio ("DSR") signals.

20. The combined GPS and radio system of claim 18, wherein the digital encoded signals are digital audio broadcasting ("DAB") signals.

21. The combined GPS and radio system of claim 1, wherein the mixer produces in-phase ("I") channel IF signals and quadrature ("Q") channel IF signals.

22. The combined GPS and radio system of claim 21, further including an I channel receiver path and a Q channel receiver path, wherein the mixer sends the I channel IF signals to the I channel receiver path and the Q channel IF signals to the Q channel receiver path.

23. The combined GPS and radio system of claim 22, wherein the I channel receiver path includes an IF amplifier, IF filter and Quantizer.

24. The combined GPS and radio system of claim 22, wherein the Q channel receiver path includes an IF amplifier, IF filter and Quantizer.

25. The combined GPS and radio system of claim 22, wherein the mixer is capable of being sampled at four times an IF frequency.

26. The combined GPS and radio system of claim 25, wherein the controller is capable of
 disabling the Q channel receiver path, and sampling either GPS signals or radio signals on the I channel receiver path at four times the IF frequency.

27. The combined GPS and radio system of claim 21, wherein the mixer sends the I channel IF signals and Q channel IF signals to a combiner.

28. The combined GPS and radio system of claim 27, further including a common receiver path, wherein the combiner sends the combined I channel IF signals and Q channel IF signals to the common receiver path.

29. The combined GPS and radio system of claim 28, wherein the common receiver path includes an IF amplifier, IF filter and Quantizer.

30. The combined GPS and radio system of claim 29, wherein the receiver path is sampled at four times an IF frequency.

31. The combined GPS and radio system of claim 30, wherein the combiner is an image rejection combiner.

32. A method for receiving Global Position System ("GPS") signals and radio signals in a combined GPS and radio system, the method comprising:
    receiving either GPS signals or the radio signals;
    receiving a frequency reference signal from a switchable frequency source having a first state of operation corresponding to GPS signals and a second state of operation corresponding to radio signals;
    controlling the switchable frequency source to periodically switch between the first switch state of operation and the second switch state of operation at a duty cycle determined to resolve a position of the combined GPS and radio system based on the received GPS signals; and
    producing intermediate frequency ("IF") signals in response to receiving GPS signals, radio signals and frequency reference signal.

33. The method of claim 32, wherein the frequency reference signal is produced by the switchable frequency source that is part of a frequency synthesizer.

34. The method of claim 33, wherein producing the frequency reference signal includes utilizing a fractional N frequency synthesizer.

35. The method of claim 33, wherein producing the frequency reference signal includes utilizing a pseudo-random code generator in signal communication with frequency synthesizer.

36. The method of claim 33, further including utilizing a second frequency reference source in signal communication with the frequency synthesizer.

37. The method of claim 32, wherein the controller is programmable.

38. The method of claim 32, wherein the radio signals are of a type selected from the group consisting of amplitude modulation ("AM"), frequency modulation ("FM"), phase modulated ("PM"), short-wave ("SW") and single-side based ("SSB").

39. The method of claim 32, wherein the radio signals are digital encoded signals.

40. The method of claim 39, wherein the digital encoded signals are digital satellite radio ("DSR") signals.

41. The method of claim 39, wherein the digital encoded signals are digital audio broadcasting ("DAB") signals.

42. The method of claim 32, wherein producing the IF signals further includes producing in-phase ("I") channel IF signals and quadrature ("Q") channel IF signals.

43. The method of claim 42, further including sending the I channel IF signals to an I channel receiver path and the Q channel IF signals to a Q channel receiver path.

44. The method of claim 43, wherein producing the IF signals further includes sampling either GPS signals or radio signals at four times the IF frequency.

45. The method of claim 44 further including
    disabling the Q channel receiver path, and
    instructing the I channel receiver path to sample either GPS signals or radio signals at four times the IF frequency.

46. The method of claim 42, further including sending I channel IF signals and Q channel IF signals from a mixer to a combiner.

47. The method of claim 46, further including sending the combined I channel IF signals and Q channel IF signals to the common receiver path.

48. The method of claim 32, wherein both GPS signals and radio signals have corresponding duty cycles.

49. The method of claim 48, further including limiting the reception of GPS signals by the mixer to a low duty cycle.

50. The method of claim 48, further including limiting the reception of radio signals by the mixer to a low duty cycle.

51. A combined Global Positioning System ("GPS") and radio system for receiving GPS signals and radio signals the combined GPS and radio system comprising:
    means for generating a frequency reference signal that has a first switch state of operation that corresponds to the receiving GPS signals and a second switch state of operation that corresponds to the receiving means receiving radio signals;
    means for controlling the combined GPS and radio system to periodically switch between the first switch state of operation and the second switch state of operation at a duty cycle determined to resolve a position of the combined GPS and radio system based on the received GPS signals; and
    means for receiving both GPS signals and radio signals and producing corresponding intermediate frequency ("IF") signals in response to receiving the frequency reference signal from the switchable frequency source.

52. The combined GPS and radio system of claim 51, wherein both GPS signals and radio signals have corresponding duty cycles.

53. The combined GPS and radio system of claim 52, wherein the controlling means limits the reception of GPS signals by the receiving means to a low duty cycle.

54. The combined GPS and radio system of claim 52, wherein the controlling means limits the reception of radio signals by the receiving means to a low duty cycle.

55. The combined GPS and radio system of claim 51, wherein the controlling means is programmable.

56. The combined GPS and radio system of claim 55, wherein the controlling means is capable of executing logic instruction that are encoded in software form.

57. The combined GPS and radio system of claim 51, wherein the controlling means is a micro-controller.

58. The combined GPS and radio system of claim 51, wherein the controlling means is a computer.

59. The combined GPS and radio system of claim 51, further including a radio frequency ("RF") front-end module in signal communication with the receiving means, where the RF front-end module is capable of receiving either GPS signals or radio signals and passing the received GPS signals or radio signals to the receiving means.

60. The combined GPS and radio system of claim 51, wherein the radio signals are of a type selected from the group consisting of amplitude modulation ("AM"), frequency modulation ("FM"), phase modulated ("PM"), short-wave ("SW") and single-side band ("SSB").

61. The combined GPS and radio system of claim 51, wherein the radio signals are digital encoded signals.

62. The combined GPS and radio system of claim 51, wherein the receiver means produces in-phase ("I") channel IF signals and quadrature ("Q") channel IF signals.

63. The combined GPS and radio system of claim 62, further including an I channel receiver path and a Q channel receiver path, wherein the receiver means sends the I channel IF signals to the I channel receiver path and the Q channel IF signals to the Q channel receiver path.

64. The combined GPS and radio system of claim 63, wherein the I channel receiver path includes an IF amplifier, IF filter and Quantizer.

65. The combined GPS and radio system of claim 63, wherein the Q channel receiver path includes an IF amplifier, IF filter and Quantizer.

66. The combined GPS and radio system of claim 63, wherein the receiver means is capable of being sampled at four times an IF frequency.

67. The combined GPS and radio system of claim 66 wherein the controlling means is capable of:
disabling the Q channel receiver path; and
sampling either GPS signals or radio signals on the I channel receiver path at four times the IF frequency.

68. The combined GPS and radio system of claim 62, wherein the receiver means sends the I channel IF signals and Q channel IF signals to a means for combining.

69. The combined GPS and radio system of claim 68, further including a common receiver path, wherein the combining means sends the combined I channel IF signals and Q channel IF signals to the common receiver path.

70. The combined GPS and radio system of claim 68, wherein the common receiver path includes an IF amplifier, IF filter and Quantizer.

71. The combined GPS and radio system of claim 70, wherein the receiver path is sampled at four times an IF frequency.

72. The combined GPS and radio system of claim 68, wherein the combining means is an image rejection combiner.

73. A non-transitory signal bearing medium having software for receiving Global Position System ("GPS") signals and radio signals in a combined GPS and radio system, the signal-bearing medium comprising:
logic for receiving either GPS signals or the radio signals;
logic for receiving a frequency reference signal from a switchable frequency source having a first state of operation corresponding to GPS signals and a second state of operation corresponding to radio signals;
controlling the switchable frequency source to periodically switch between the first switch state of operation and the second switch state of operation at a duty cycle determined to resolve a position of the combined GPS and radio system based on the received GPS signals; and
logic for producing intermediate frequency ("IF") signals in response to receiving GPS signals, radio signals and frequency reference signals.

74. The non-transitory signal bearing medium of claim 73, wherein the radio signals are of a type selected from the group consisting of amplitude modulation ("AM"), frequency modulation ("FM"), phase modulation ("PM"), short-wave ("SW") and single-side band ("SSB").

75. The non-transitory signal bearing medium of claim 73, wherein the radio signals are digital encoded signals.

76. The non-transitory signal bearing medium of claim 75, wherein the digital encoded signals are digital satellite radio ("DSR") signals.

77. The non-transitory signal bearing medium of claim 75, wherein the digital encoded signals are digital audio broadcasting ("DAB") signals.

78. The non-transitory signal bearing medium of claim 73, wherein the logic for producing the IF signals further includes logic for producing in-phase ("I") channel IF signals and quadrature ("Q") channel IF signals.

79. The non-transitory signal bearing medium of claim 78, further including logic for sending the I channel IF signals to an I channel receiver path and the Q channel IF signals to a Q channel receiver path.

80. The non-transitory signal bearing medium of claim 79, wherein the logic for producing the IF signals further includes logic for sampling either GPS signals or radio signals at four times the IF frequency.

81. The non-transitory signal bearing medium of claim 80, further including
logic for disabling the Q channel receiver path, and
logic for instructing the I channel receiver path to sample either GPS signals or radio signals at four time the IF frequency.

82. The non-transitory signal bearing medium of claim 78, further including logic for sending the I channel IF signals and Q channel IF signals from a mixer to a combiner.

83. The non-transitory signal bearing medium of claim 82, further including logic for sending the combined I channel IF signals and Q channel IF signals to the common receiver path.

84. The non-transitory signal bearing medium of claim 73, wherein both GPS signals and radio signals having corresponding duty cycles.

85. The non-transitory signal bearing medium of claim 84, further including logic for limiting the reception of GPS signals by the mixer to a low duty cycle.

86. The non-transitory signal bearing medium of claim 84, further including logic for limiting the reception of radio signals by the mixer to a low duty cycle.

* * * * *